United States Patent
Hovis (10) Patent No.: US 10,310,611 B1
(45) Date of Patent: Jun. 4, 2019

(54) PORTABLE CONTROLLER

(71) Applicant: Dura Operating, LLC, Auburn Hills, MI (US)

(72) Inventor: Jeff Hovis, Almont, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/850,427

(22) Filed: Dec. 21, 2017

(51) Int. Cl.
*G06F 3/01* (2006.01)
*G06F 3/0346* (2013.01)
*G06F 3/0482* (2013.01)
*G06F 3/0484* (2013.01)
*G06F 3/0488* (2013.01)

(52) U.S. Cl.
CPC ............ *G06F 3/016* (2013.01); *G06F 3/0346* (2013.01); *G06F 3/0482* (2013.01); *G06F 3/0488* (2013.01); *G06F 3/04842* (2013.01)

(58) Field of Classification Search
CPC .......... A63F 13/285; G06F 3/01; G06F 3/016; G06F 3/02; G06F 3/04847; G06F 3/0362
See application file for complete search history.

(56) References Cited

U.S. PATENT DOCUMENTS

| | | | | |
|---|---|---|---|---|
| 7,027,881 B2 * | 4/2006 | Yumoto | .................. | G08C 17/02 700/168 |
| 9,760,174 B1 * | 9/2017 | Letendre | .................. | G06F 3/016 |
| 2008/0174550 A1 * | 7/2008 | Laurila | ................... | A63F 13/02 345/158 |
| 2011/0306425 A1 * | 12/2011 | Rivard | .................. | A63F 13/285 463/37 |

FOREIGN PATENT DOCUMENTS

WO   WO 2011156896 A1 * 12/2011 ........... A63F 13/285

OTHER PUBLICATIONS

Abdulmotaleb El Saddik et al., "A Novel Biometric System for Identification and Verification of Haptic Users", Jun. 3, 2007, IEEE Transactions on Instrumentation and Measurement, vol. 56, No. 3, pp. 895-906.*
Dr. K. Rameshbabu et al., Advanced Remote with HAPTIC, International Journal of Modern Engineering Research, vol. 2, Issue 3, May-Jun. 2012.

* cited by examiner

*Primary Examiner* — Carlos Garcia
(74) *Attorney, Agent, or Firm* — Robert E. Ford; Raymond J. Vivacqua; Steven L. Crane (57) ABSTRACT

A system for managing devices includes a portable device with a human-machine interface (HMI) controller having a first input receiving first input data, a movable portion having an adjustable haptic feedback mechanism and a plurality of tactile mechanisms, a second input disposed within the portable device, the second input generating second input data, a third input receiving the second input data from the second input, the third input providing access to a standardized function catalog on each of the devices based on the second input data, and based on the first input data received by the first input, the system selectively accesses a subset of the plurality of functions on each of the devices, and the haptic feedback mechanism and the plurality of tactile mechanisms access and select preferences within the plurality of functions on the devices.

26 Claims, 5 Drawing Sheets

PORTABLE CONTROLLER

FIELD

The present disclosure relates generally to electronically-controlled systems, and more specifically to systems and methods for controlling a plurality of functions within a plurality of electronically-controlled systems.

BACKGROUND

The statements in this section merely provide background information related to the present disclosure and may or may not constitute prior art.

The quantity of systems and hardware with which an individual interacts on a daily basis continues to grow with rapid pace of technological advancement. Moreover, such systems and hardware have become increasingly complex as the quantity and variety of systems operated or controlled electronically has grown. To manage the parameters associated with each piece of hardware, increasingly complex systems with increasingly numerous operator selectable settings are commonly used. Selectable settings can be managed in individual human-machine interface (HMI) associated with each of the systems, however with the rise of touch-screen interfaces, many of the settings can now be accessed directly through a single HMI, or other such access points. While the ability to manage a wide variety of systems and settings is desirable, navigating through a menu structure that includes settings for a large quantity and variety of systems can be complex, confusing, and require a significant amount of operator attention. This is particularly true in cases where the HMI is primarily a touch-screen interface, because many such touch-screens provide little or no haptic feedback. Without haptic feedback navigating menu structures to access particular functions can be challenging without spending significant amounts of time looking directly at the touch-screen(s). That is, as menu structures to access specific functions become more complicated and/or convoluted, it can be difficult to successfully and accurately access specific functionality for a specific piece of hardware, thereby increasing the amount of time an operator must invest in order to access each desired function.

Thus, while current control systems and methods achieve their intended purpose in providing access to a wide variety of applications and selectable functions within a wide variety of hardware devices, there is a need for new and improved systems and methods for accessing functionality within a wide variety of hardware devices. Moreover, there is a need for a system and method which reduces operator time investment, and thereby reduces the potential for operator frustration, while providing consistency and portability with respect to haptic feedback, functionality, and accessibility.

SUMMARY

According to one aspect of the present disclosure a system for managing devices includes a portable device with a human-machine interface (HMI) controller having a first input receiving first input data, a movable portion having a movement such as rotary movement and having an adjustable haptic feedback mechanism and a plurality of tactile mechanisms, a second input disposed within the portable device, the second input generating second input data, a third input receiving the second input data from the second input, the third input providing access to a standardized function catalog on each of the devices based on the second input data, wherein based on the first input data received by the first input, the system selectively accesses a subset of the plurality of functions on each of the devices, and the haptic feedback mechanism and the plurality of tactile mechanisms access and select preferences within the plurality of functions on the devices.

In another aspect of the present disclosure the first input includes a biometric sensor receiving biometric input data.

In yet another aspect of the present disclosure the second input further includes an electromagnetic signal emitter transmitting an electromagnetic signal to an electromagnetic signal receiver.

In still another aspect of the present disclosure the electromagnetic signal includes an infrared signal.

In still another aspect of the present disclosure the second input includes a three dimensional positioning system.

In still another aspect of the present disclosure the three dimensional positioning system includes at least one of a gyroscope, an accelerometer, a global positioning system (GPS) sensor, an electromagnetic signal sensor, an electromagnetic signal emitter, and a three dimensional map.

In still another aspect of the present disclosure the third input includes device selection data.

In still another aspect of the present disclosure the fourth input includes function selection data.

In still another aspect of the present disclosure method for managing devices includes receiving a first input to a portable device with a human-machine interface (HMI) controller having an adjustable haptic feedback mechanism, a rotary access interface, and a plurality of tactile mechanisms, receiving a second input providing location and position data relating to a location and position of the HMI controller, receiving a third input selecting one of a plurality of selectable devices based on the location and position data of the HMI controller, actively adjusting the haptic feedback mechanism in the HMI controller based on a selected device, receiving a fourth input selecting a function on the selected device, actively adjusting the haptic feedback mechanism in the HMI controller based on a selected function within the selected device, and receiving a fifth input selecting a preference within the selected function on the selected device.

In still another aspect of the present disclosure the location and position data is determined by a three dimensional positioning system comprising at least one of a gyroscope, an accelerometer, a global positioning system (GPS) sensor, an electromagnetic sensor, an electromagnetic emitter, and a three dimensional map.

In still another aspect of the present disclosure the first input further includes a biometric input.

In still another aspect of the present disclosure each of the plurality of selectable devices further includes a selectable function catalog.

In still another aspect of the present disclosure the first input generates a profile wherein the profile includes user preferences, solar position data, ambient light data, ambient temperature data, location and movement data, route data, destination data, and path data.

In still another aspect of the present disclosure the profile is associated with a subset of the selectable function catalog within each of the selectable devices.

15. The method of claim 9 wherein receiving a second input further includes generating within a location sensor disposed within the portable device.

In still another aspect of the present disclosure actively adjusting a haptic feedback mechanism in the HMI controller further includes generating a detent in a rotational travel of the rotary access interface of the HMI controller.

In still another aspect of the present disclosure the detent varies in quantity, size, and resistance in accordance with the selected device and with the selected function within the selected device.

In still another aspect of the present disclosure each of the receiving a third input and receiving a fourth input further includes receiving a tactile input to the tactile feedback mechanisms of the HMI controller.

In still another aspect of the present disclosure a portable system for managing devices includes a hand-held device with a human-machine interface (HMI) controller having a biometric input receiving biometric input data, a rotary portion having an adjustable haptic feedback mechanism and a plurality of tactile mechanisms, a three-dimensional location system disposed within the portable device, the three-dimensional location system generating three-dimensional position data, a receiver receiving the three-dimensional position data, and providing access to a standardized function catalog on each of the devices based on the three-dimensional position data, wherein based on the biometric input data received by the biometric input, the system selectively accesses a subset of the plurality of functions on each of the devices, and the haptic feedback mechanism and the plurality of tactile mechanisms access and select preferences within the plurality of functions on the devices.

In still another aspect of the present disclosure the adjustable haptic feedback mechanism adjust a haptic feedback by generating a detent in a rotational travel of a rotary access interface of the HMI controller, and wherein the detent varies in quantity, size, and resistance in accordance with each of the devices in accordance with each of the plurality of functions in each of the devices.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. In the drawings.

DETAILED DESCRIPTION

The following description is merely exemplary in nature and is not intended to limit the present disclosure, application, or uses.

Figure 1:
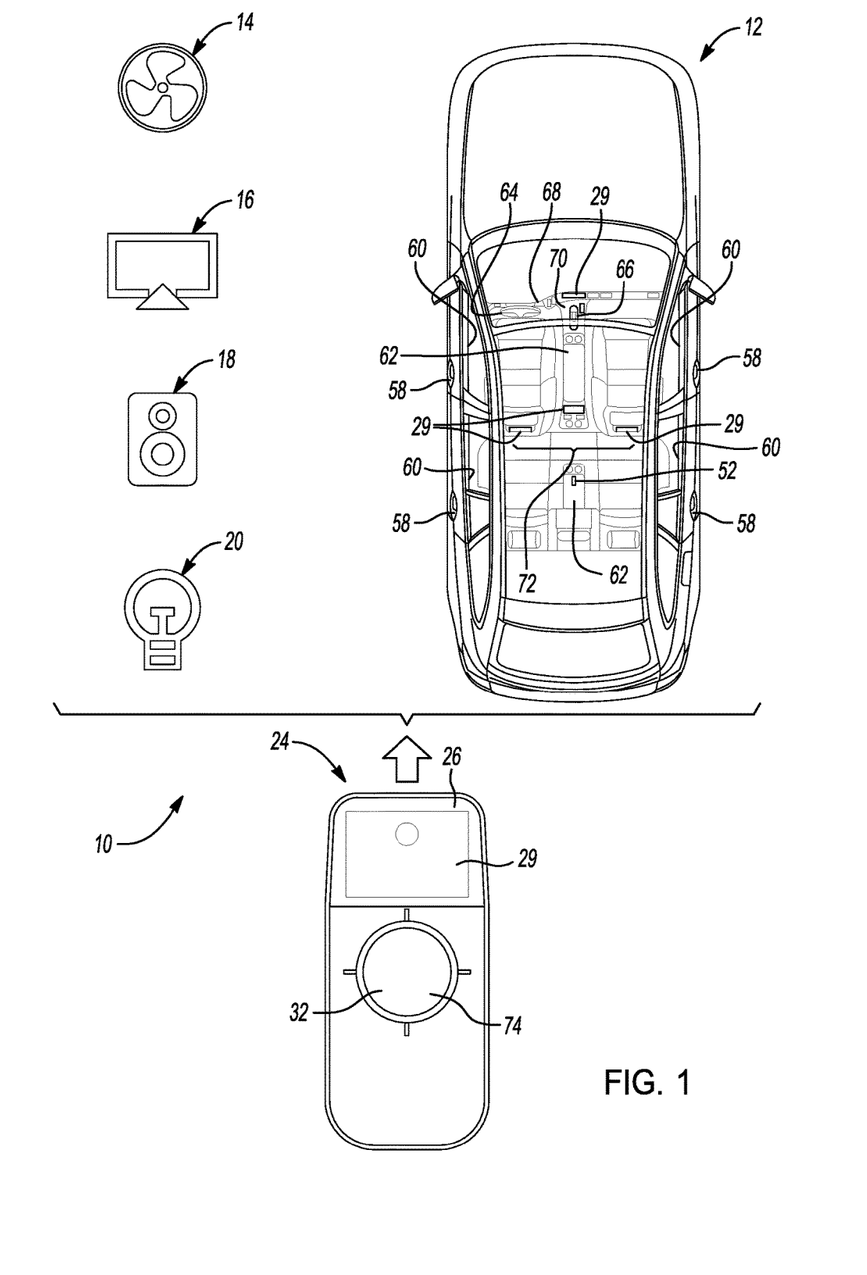
FIG. 1 is a schematic view of a system including a portable controller according to one aspect of the present disclosure.
Figure 2A:
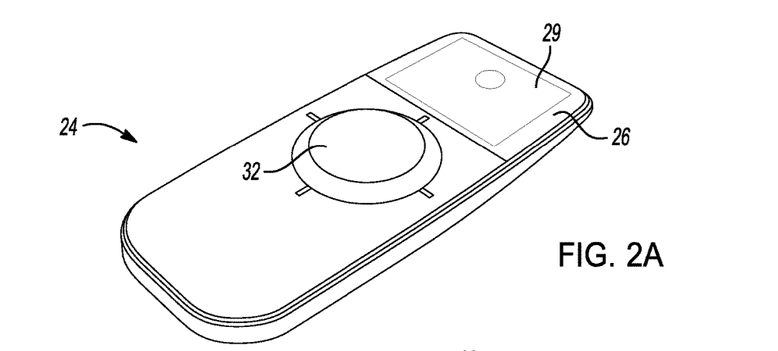
FIG. 2A is a perspective view of a portable controller according to an aspect of the present disclosure.
Figure 2B:
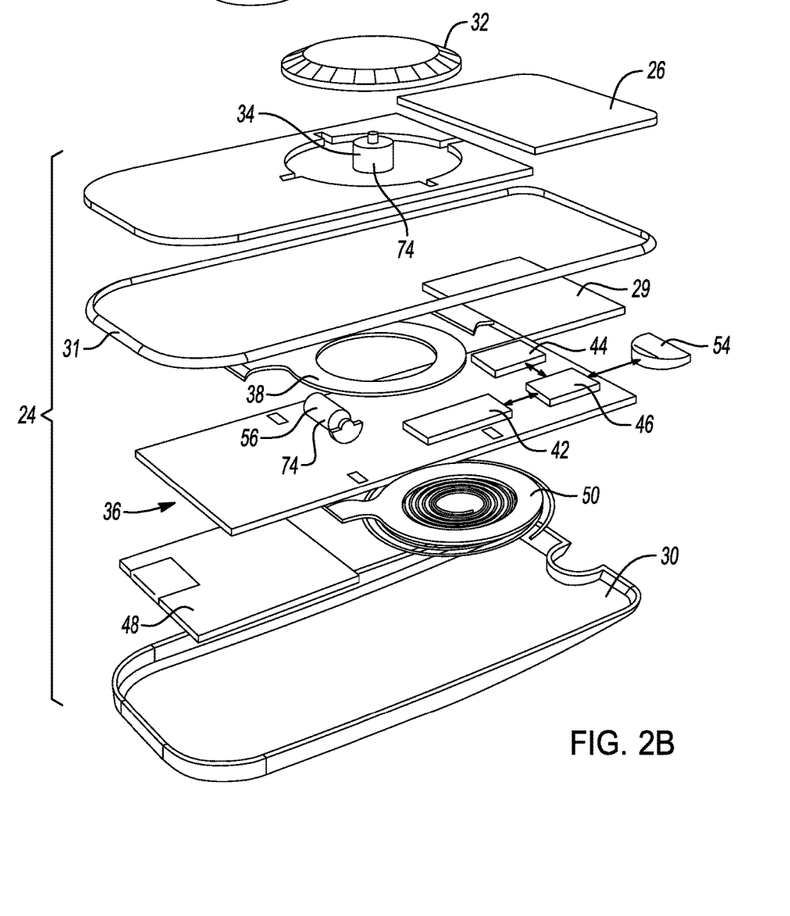
FIG. 2B is a perspective exploded view of the portable controller of FIG. 2A according to an aspect of the present disclosure.
Figure 3:
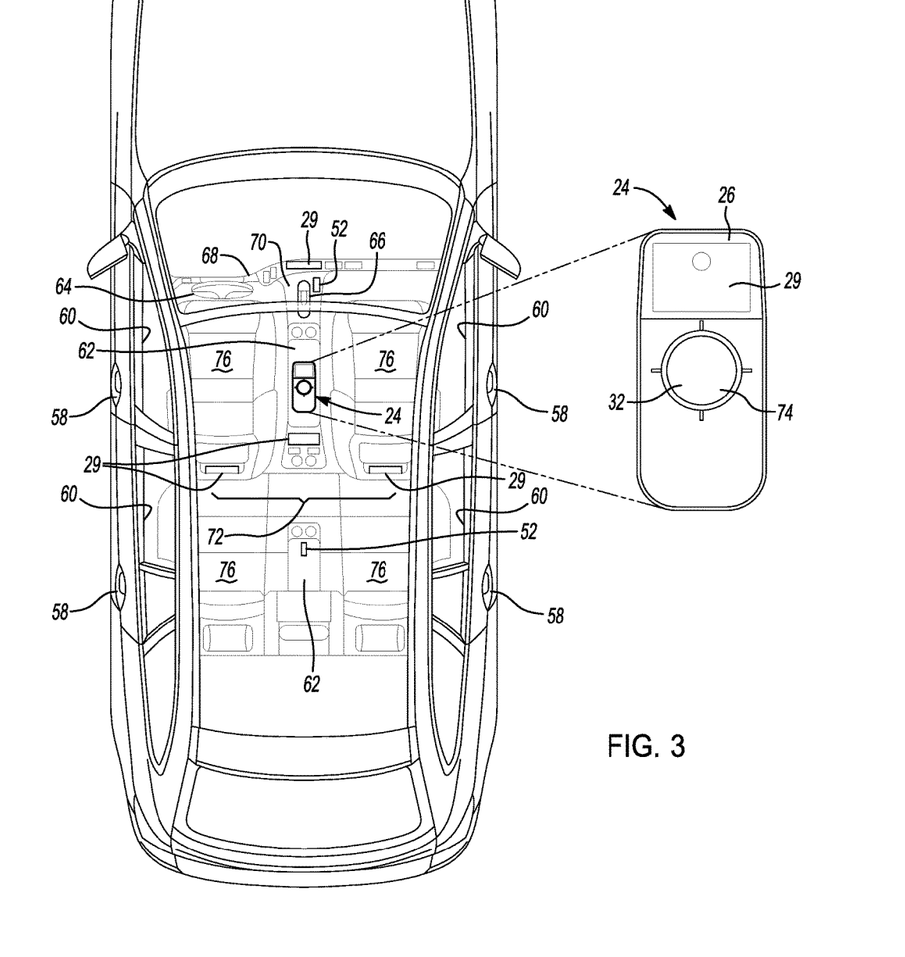
FIG. 3 is a partial top view of a motor vehicle for use with a portable controller according to an aspect of the present disclosure.

Referring to FIGS. 1-3, a system for managing a wide variety of functions is shown and generally indicated by reference number 10. The system 10 can be used with a host vehicle 12, and/or with a plurality of in-home devices and systems such as heating, ventilation, and air-conditioning (HVAC) systems and thermostats 14, (TVs) and associated TV peripheral devices 16, gaming systems, Hi-Fidelity (Hi-Fi) systems 18, lighting systems 20, computers (not shown), electronic home-management systems (not shown), and the like, hereinafter collectively referred to as in-home devices and systems 22. The system 10 includes a Human-machine Interface (HMI) controller or portable device 24 that can be moved between and interact with and control the functionality of host vehicles 12 as well as any of the aforementioned in-home devices and systems 22.

The portable device 24 includes a faceplate 26 with a lens or lens cover 28, the faceplate 26 and a bottom cover 30 sandwiching a plurality of electrical components, with a decorative bezel 31 surrounding a periphery of the portable device 24. In some aspects, the base plate includes a plurality of switches (not shown), and a movable portion having a movement such as rotary movement. In some aspects, the movable portion is a rotary knob 32. The rotary knob 32 is disposed overtop a rotary motor 34 in electrical communication with a function control module 36. In some aspects, the rotary knob 32 may be better described as a capacitive device sensitive to touch. In other words, in some examples, the rotary knob is disposed overtop a first or biometric input 38. The function control module 36 is in electronic communication with a display 40 and the biometric input 38 of the portable device 24. The function control module 36 is a non-generalized electronic control device having a preprogrammed digital computer or processor 42, memory or non-transitory computer readable medium 44 used to store data such as control logic, instructions, image data, lookup tables, etc., and a plurality of input/output peripherals or ports 46. The processor 42 is configured to execute the control logic or instructions. The function control module 36 may have additional processors 42 or additional integrated circuits in communication with the processor 42. The function control module 36 is electrically connected to a battery 48. In some aspects, the portable device 24 includes a wireless charging member 50 for induction charging on an induction charging dock 52, and an input/output member 54 such as an infrared transmitter and/or receiver. In some aspects, the function control module 36 includes additional componentry and features such as a vibration motor 56 a wireless communications (WiFi) device (not shown), and a security chip (not shown).

The function control module 36 can output to the display 40 on the portable device 24 as well as to displays 40 located within the host vehicle 12 or displays 40 in the host vehicle 12 or on the in-home device or system 22 presently being accessed by the portable device 24 user. The display 40 is operable to display and/or access a plurality of functions within a standardized application catalog (not shown). The standardized application catalog includes a plurality of subsystems and functions associated with each of a plurality of on-board systems in the host vehicle 12, as well as each of the individual in-home devices and systems 22. In one aspect, the standardized application catalog of the host vehicle 12 includes, but is not limited to: steering and steering settings, suspension and suspension settings, braking and braking settings, throttle and throttle mappings, audio settings, telephone connection settings, Bluetooth settings, wireless communication (WiFi) and WiFi Hotspot settings, navigational or GPS settings, vehicle status functions and information, climate control information, and the like. In several other aspects, the standardized application catalog of the in-home devices and systems 22 includes, but is not limited to: audio settings for TV 16 and Hi-Fi 18 systems, lighting system 20 settings, telephone connection settings, Bluetooth settings, wireless communication (WiFi) and WiFi Hotspot settings, climate control information for HVAC system thermostats 14, and the like.

Referring back to the biometric input 38, in several aspects, the biometric input 38 is a biometric sensor, scanner, or other recording apparatus disposed within the portable device 24. The biometric input 38 records a physical characteristics of a user of the host vehicle 12, such as a fingerprint, a palm print, a vein scan, iris or retina scan, hand geometry scan, facial structure scan, voice scan, or the like. In another aspect, the biometric input 38 operates to record and catalog a behavioral characteristic, such as a pattern of system 10 usage. In an example of a host vehicle 12, a pattern of usage may include a driving style, seat position, radio volume or station, or the like. In some aspects, the biometric input 38 in a host vehicle 12, the biometric input 38 may be internal to the portable device 24 as well as external. For example the biometric input 38 can be located on an exterior door handle 58, an interior door handle 60, an arm rest 62, a steering wheel 64, a shifter lever 66, a dashboard 68, a center console 70, or an interior or exterior camera (not shown).

The biometric input 38 is in electronic communication with the host vehicle 12, and more specifically, in electronic communication with the standardized application catalog. The function control module 36 receives first or biometric input data from the biometric input 38 of the portable device 24. The function control module 36 also receives second input data from a second input (not specifically shown). In several aspects, the second input data includes a conditional data, such as a time, a temperature, a location, a solar position, or with reference to a host vehicle 12: a path designation, a destination, a road type, a vehicle position, a vehicle status, and the like is collected by a plurality of systems associated with each type of conditional data. The second input data further includes locational data. Thus, the second input data is generated in part by at least one of a gyroscope, an accelerometer, a global positioning system (GPS) sensor, an electromagnetic (EM) location system having at least one EM sensor and at least one EM emitter, and a three dimensional map, or the like. In more general terms, the second input data includes information about the present location of the portable device 24, such as an attitude, altitude, inclination, declination, rotational position, direction of movement, velocity, acceleration, and the like. In one example, the EM location system includes at least one EM signal transmitter, such as the input/output member 48 within the portable device 24, the input/output member 48 transmitting an EM signal to an EM signal receiver (not specifically shown). In several aspects, the input/output member 48 is an infrared transmitter, a laser transmitter, a light-emitting diode (LED), or the like. The input/output member 48 is disposed within at least one of the host vehicle 12, and/or at least one of the individual in-home devices and systems 22. The EM signal transmitted by the input/output member 48 is received by the EM signal receiver disposed within the portable device 24. In some aspects, the portable device 24 includes an input/output member 48 capable of both sending and receiving EM signals, thus allowing the portable device 24 to both transmit EM signals to devices and to receive EM signals. That is, for the portable device 24 to control one of the host vehicle 12 systems or one of the in-home devices and systems 22, the portable device 24 not only transmits EM signals to the devices and systems 12, 22, but receives and responds to EM signals from the devices and systems 12, 22.

The function control module 36 of the portable device 24 combines the biometric input data and the conditional data, including the locational data, to selectively provide an operator of the portable device 24 access to a subset of the full standardized application catalog relevant to an a host vehicle 12 system, or in-home device or system 22 towards which the portable device 24 is currently directed. The function control module 36 then maps selectable functions of the subset of applications to the portable device 24 for the operator to access. In one aspect, the function control module 36 also maps selectable functions of the subset of applications to the display 40.

In an example, when the operator uses the portable device 24 within the interior of the host vehicle 12, the operator's preferences regarding seating position, climate control, radio station, audio volume, instrument cluster brightness, interior lighting brightness and/or color, and so forth are mapped to the portable device 24 and to the display 40. As the operator of the host vehicle 12 uses various functions of the host vehicle 12 over time, the function control module 36 accumulates data regarding how the operator/operator uses the various functions. The function control module 36 associates the usage data with a particular biometric input data received by the biometric input 38. Thus, as the operator/operator accesses the host vehicle 12 and generates biometric input data, the function control module 36 applies preferred settings for the specific operator/operator using the system 10. In another example, the operator/operator of the host vehicle 12 may directly input applications, functions, and settings to be saved as favorites within the standardized application catalog, thereby manually generating the subset of the full standardized application catalog.

Figure 4A:
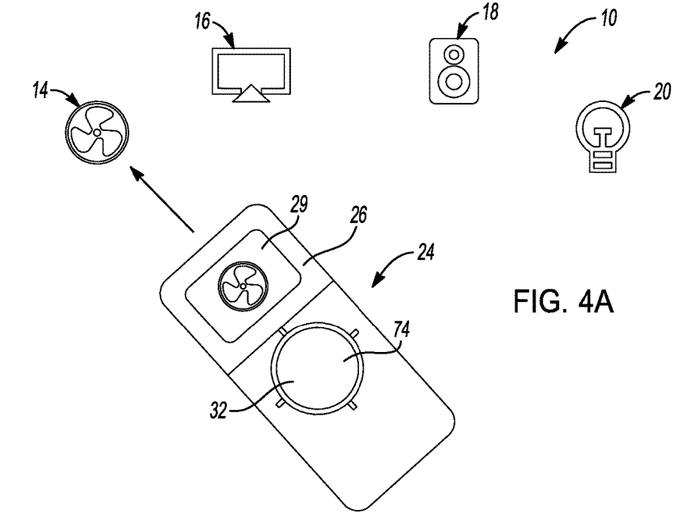
FIG. 4A is a schematic view of a portable controller interacting with a plurality of in-home devices and systems according to an aspect of the present disclosure.
Figure 4B:
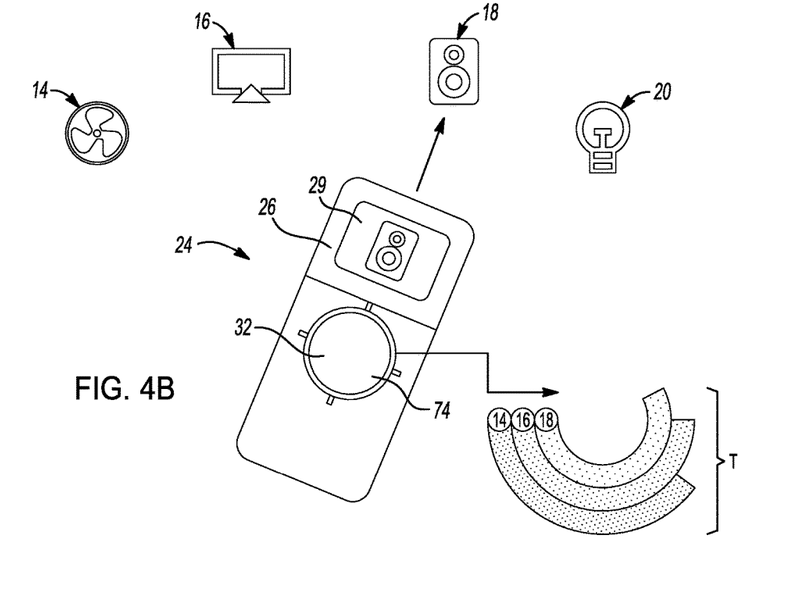
FIG. 4B is a second schematic view of a portable controller interacting with a plurality of in-home devices and systems according to another aspect of the present disclosure.

In another example, an operator carries the portable device 24 into a living room of his or her home, shown schematically in FIGS. 4A and 4B, the room having an HVAC system thermostat 14, a TV 16, a HiFi system 18, and a lighting system 20 spaced around the room. The operator accesses functionality of each of the above-referenced devices and systems 22 by manipulating the portable device 24. More specifically, by pointing the portable device 24 at the thermostat 14, the three-dimensional location system of the portable device 24 creates conditional data and locational data indicating that the portable device 24 is inside the living room of the operator's home, and that the portable device 24 is currently being pointed at the thermostat 14. Based on specific operator preferences stored in memory and associated with the biometric input data of the current operator, the portable device 24 selectively accesses a subset of features and functions within the thermostat 14, and maps these features and functions to the portable device 24. In a further example, by mapping the subset of features and functions within the thermostat 14 to the portable device 24, the operator can thereby access such preferred functions as temperature, fan speed, on/off schedule, and the like on a single display 40, rather than navigating multiple menus.

In another specific example, an operator accesses the host vehicle 12 at the end of the work-day via the exterior door handle 58. A biometric input 38 is disposed in the exterior door handle 58, and sends biometric input data to the function control module 36 of the portable device 24 which the operator either carries with him/herself or which resides within the host vehicle 12. The operator has previously set a specific radio station and volume on the host vehicle's 12 stereo system. Based on the biometric input data transmitted to the function control module 36 of the portable device 24, the same previously set radio station and volume settings are applied to the host vehicle's 12 stereo, as well as being depicted on the display 40, and being made accessible directly via the portable device 24. In a further example, in addition to the volume and station selections, based on the time of day at which the operator is using the host vehicle 12, the function control module 38 applies settings to the GPS including route selection to the operator's home and traffic information including selecting the most time-efficient route and depicts the route and traffic information on the display 40. In another related, but non-limiting example, the portable device 24 is used by a rear-seat passenger of the host vehicle 12. Based on biometric input data collected by a biometric input 38 disposed on the rear exterior door handle 58, or on the portable device 24 itself, the system 10 provides selective access to a rear-seat entertainment system 72. In other words, based on the biometric input data, conditional data, such as the time of day, and locational data, such as the position of the portable device 24 in the rear-seat portion of the passenger compartment of the host vehicle 12, the system 10 determines that the subset of the standard application catalog that should be accessible by the operator is limited to certain functions of the rear-seat entertainment system 72, and a rear-seat climate control system (not specifically shown).

In another example, the biometric input 38 is disposed on the shifter lever 66, and an operator who has previously operated the host vehicle 12 enters and begins to drive the host vehicle 12 to an unfamiliar destination. Based on the completely new destination information input into the GPS, the function control module 36 adjusts settings on the navigation system, stereo system, and phone connection or Bluetooth systems. The function control module's 36 adjustments improve route clarity, reduce audio volume (except for navigational instructions), and alters operation of the operator's phone to reduce potential sources of operator distraction, thereby improving driving safety. While in the above discussion, the function control module 36 is described as managing host vehicle 12 stereo and GPS information, it should be understood that the function control module 36 interacts with and controls access to and functions of a wide variety of host vehicle systems 10, as well as a wide variety of in-home devices and systems 22. Furthermore, it should be understood that a plurality of applications of the subset of the standardized application catalog may be displayed singly or together, and that the subset of applications may therefore be accessed singly or accessed simultaneously.

Referring once more to FIGS. 4A and 4B, and with continuing reference to FIGS. 1-3, the rotary knob 32 is manipulated by an operator's hand. The rotary knob 32 is mechanically connected to a tactile or haptic feedback mechanism 74. In some aspects, the haptic feedback mechanism 74 provides multiple feedback types to the operator. In one aspect, the rotary motor 34 provides variable torque to rotational motion of the rotary knob 32, as depicted specifically by the rotational traces and limits in FIG. 4B. In an example, as an operator manipulates the rotary knob 32, the rotary motor 34 provides a torque that resists movement of the rotary knob 32 such that the torque is commensurate with a particular application or function that the operator is accessing within the portable device 24. In other words, in an example in which the operator is accessing a temperature setting function within a climate control application via the portable device 24, the function control module 36 directs the rotary motor 34 to provide torque that replicates a plurality of detents in the motion of the rotary knob 32. In another example, when the operator accesses a radio volume function within an entertainment application via the portable device 24, the function control module 36 directs the rotary motor 34 to generate a torque that replicates the movement of a smooth heavily-weighted mechanical stereo knob, or other rheostatic device. While the torque provided by the rotary motor 34 has been described above as a plurality of detents, or a smooth heavily-weighted mechanical stereo knob, it should be understood that a wide variety of different torque types can be provided depending on the particular function and application being accessed via the portable device 24. Furthermore, while the system 10 is shown as having only a single portable device 24 in FIGS. 1, 2, 4A, and 4B, it should be understood that the system 10 may include a plurality of portable devices 24 without departing from the scope or intent of the present disclosure. For example, the system 10 may include portable devices 24 accessible by operators in each of the seats 76 depicted in FIG. 3. The portable devices 24 may be placed in an interior door handle 60, an arm rest 62, a steering wheel 64, a shifter lever 66, a dashboard 68, a center console 70, or the like.

In another aspect, the haptic feedback mechanism 74 includes the vibration motor 56 generating vibrations perceptible by the operator via the portable device 24. In one example, when the operator manipulates the portable device 24 to select an application, a function, or a setting within either, the function control module 36 directs the vibration motor 56 to generate a vibration indicating that a selection has been made. In a more specific example, an operator uses the portable device 24 to select a communications system (not shown), pair the operator's cellular phone (not shown) with the audio system (not shown) of the host vehicle 12, select a phone number stored in a memory of the cellular phone, and then call the phone number. For each of the above selections (four selections in this particular example), the vibration motor 56 disposed in the portable device 24 generates a vibration having a short duration, for example, less than a second, indicating that an operator input or selection is being made, thereby transmitting tactile confirmation of the operator's selections to the operator. While the vibrations generated by the vibration motor 56 have been described as being less than a second in duration, it should be understood that the duration of the vibration generated may vary substantially, but should generally be commensurate with the types of selections the operator of the system 10 makes.

Figure 5:
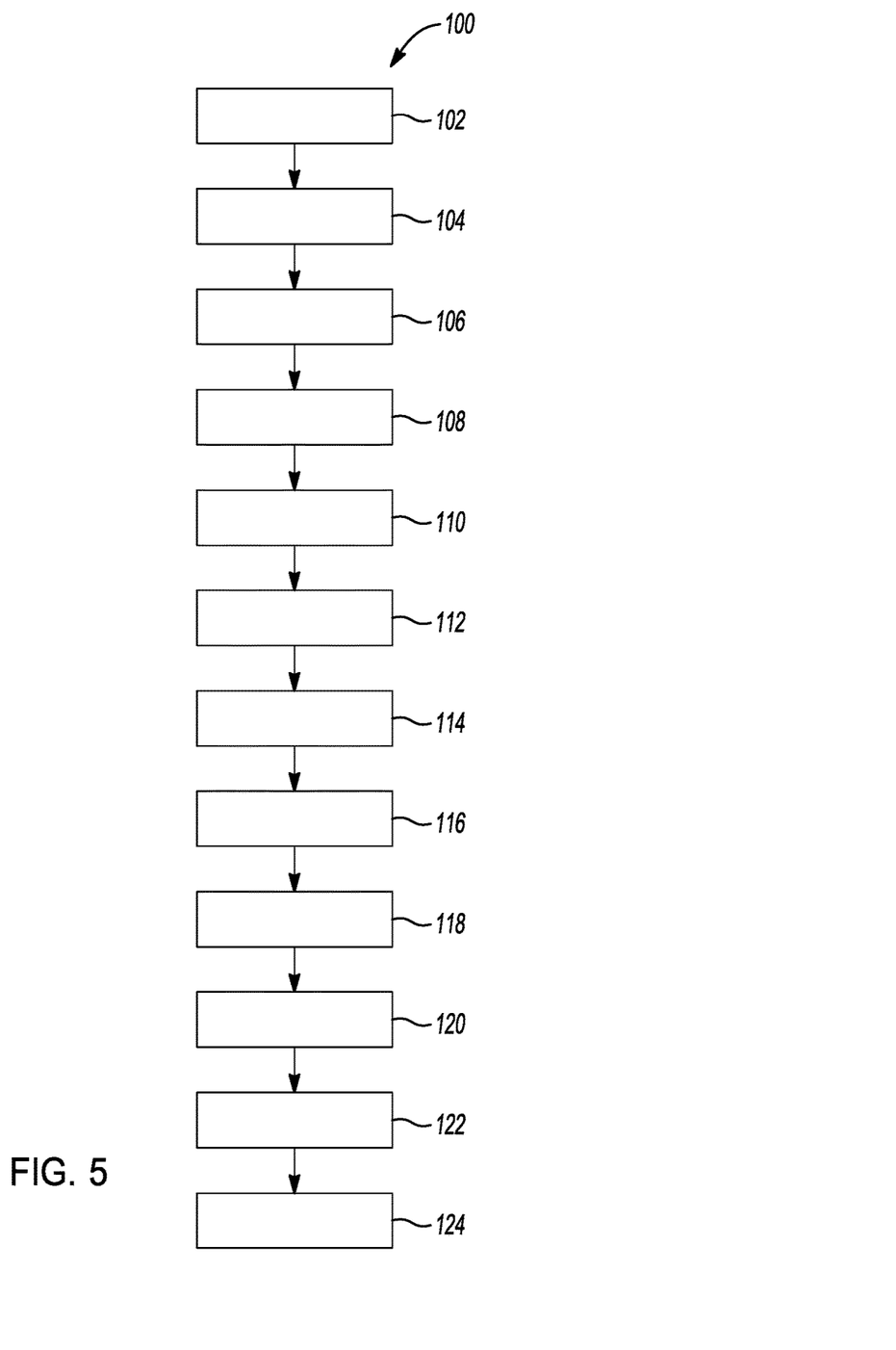
FIG. 5 and a system diagram depicting a method of using a portable controller according to an aspect of the present disclosure.

Turning now to FIG. 5 and with continuing reference to FIGS. 1-4B, a method 100 for managing functions of host vehicle 12 systems and in-home devices and systems 22 depicted. The method begins at block 102 where the biometric input 38 receives biometric input data generated by the operator. At block 104, the function control module 36 receives conditional data including location data placing the portable device 24 in a host vehicle 12 a home, or any number of other locations. At block 106 the operator physically directs the portable device 24 towards a host vehicle 12 system or an in-home device or system 22. At block 108, physical positioning sensors, such as the aforementioned gyroscope, accelerometer, etc., record positioning information about the attitude, altitude, inclination, declination, rotational position, direction of movement, velocity, acceleration, and the like of the portable device 24, and send the positioning information to the function control module 36. At block 110, the function control module 36 combines the biometric input data, the conditional data, the location data, and the positioning information and selects a subset of applications of the standardized application catalog to depict on the display or displays 40. The subset of applications is associated with preferences, previous selections, and situational information relating to the current operator and situation. At block 112, the function control module 36 of the system 10 presents an application interface (not shown) on the display 40 of the portable device 24, and in some examples, on the display 40 of the host vehicle 12 or the in-home device or system 22 as well. At block 114, the operator selects an application of the subset of applications, and the haptic feedback mechanism 74 generates haptic feedback associated with the application selection. At block 116, the function control module 36 of the system 10 determines a plurality of selectable functions relating to the selected application, and at block 118, the function control module 36 presents an application management interface (not shown) having the plurality of selectable functions. At block 120, the operator selects a function, and the haptic feedback mechanism 74 generates haptic feedback associated with the function selection. At block 122, the function control module 36 determines information relating to the selected function and displays the information on the display 40 of the portable device 24 and in some aspects, on the display 40 of the host vehicle 12 or the in-home device or system 22 as well. At block 124, the function control module 36 determines haptic feedback relating to the selected function, and actively adjusts the haptic feedback mechanism 74 in the portable device 24 based on the selected function within the selected application.

The portable device 24 and the system 10 of the present disclosure offers several advantages. These include ease of use, portability, broad functionality, simplicity of construction, redundancy, and when used with a host vehicle, improved road safety. The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for managing devices comprising:
   a human-machine interface (HMI) controller having a first input receiving first input data and a movable portion having an adjustable haptic feedback mechanism;
   a second input disposed within the HMI controller, the second input generating second input data including a location of the HMI controller;
   a third input receiving the second input data from the second input, the third input providing access to a standardized function catalog associated with one of the devices based on the second input data;
   wherein based on the first input data received by the first input, the system selectively accesses a subset of the standardized function catalog, and the moveable portion accesses and selects preferences within the subset of the standardized function catalog.

2. The system of claim 1 wherein the first input comprises a biometric sensor receiving biometric input data.

3. The system of claim 1 wherein the second input further comprises an electromagnetic signal emitter transmitting an electromagnetic signal.

4. The system of claim 3 wherein the electromagnetic signal comprises an infrared signal.

5. The system of claim 3 wherein the second input comprises a three dimensional positioning system.

6. The system of claim 5 wherein the three dimensional positioning system comprises at least one of a gyroscope, an accelerometer, a global positioning system (GPS) sensor, an electromagnetic signal sensor, an electromagnetic signal emitter, and a three dimensional map and the location is selected from the group consisting of an attitude, an altitude, an inclination, a declination, a rotational position, a direction of movement, a velocity, an acceleration, and a global position based on a global position system (GPS).

7. The system of claim 1 wherein the third input comprises device selection data.

8. The system of claim 1 wherein the third input comprises function selection data.

9. A method for managing a plurality of devices, the method comprising:
   receiving a first input by a portable device having an access interface of an HMI controller, wherein the first input includes biometric data;
   receiving a second input providing conditional data of the HMI controller;
   receiving a third input selecting a catalog of functions from one of the plurality of devices based on the second input;
   selecting a subset of the catalog of functions based on the first input;
   mapping the access interface to the subset of the catalog of functions;
   receiving a fourth input from the access interface selecting a function on the selected device; and
   adjusting a haptic feedback mechanism connected to the access interface based on the selected function on the selected device.

10. The method of claim 9 wherein the conditional data is selected from the group consisting of a time, a temperature, a location, and a solar position.

11. The method of claim 9 further comprising:
    receiving a fourth input from the access interface selecting a function on the selected device;
    remapping the access interface based on the selected function on the selected device; and
    receiving a fifth input selecting a preference within the selected function on the selected device.

12. The method of claim 9 wherein the conditional data is selected from the group consisting of a path designation of a vehicle, a destination of the vehicle, a road type on which the vehicle is traveling, a vehicle position, and a vehicle status.

13. The method of claim 9 further comprising generating a profile from the first input, wherein the profile comprises user preferences, solar position data, ambient light data, ambient temperature data, location and movement data, route data, destination data, and path data.

14. The method of claim 13 wherein the profile is associated with the subset of the catalog of functions within each of the selectable devices.

15. The method of claim 9 further comprising generating the second input by a device connected to the HMI controller.

16. The method of claim 9 further comprising adjusting a haptic feedback mechanism connected to the access interface in the HMI controller by generating a detent in a rotational travel of the access interface of the HMI controller.

17. The method of claim 16 wherein the detent varies in quantity, size, and resistance in accordance with the selected device and with the selected function within the selected device.

18. The method of claim 9 wherein the subset of the catalog of functions includes a seating position, climate control, radio station, audio volume, instrument cluster brightness, interior lighting brightness, or interior lighting color.

19. The method of claim 9 further comprising:
accumulating usage data regarding the subset of the catalog of functions;
associating the usage data with the biometric data; and
adjusting the subset of the catalog of functions based on the usage data.

20. The method of claim 9 further comprising:
adjusting the subset of the catalog of functions using the access interface.

21. The method of claim 9 further comprising communicating to the selected device a setting based on the first input.

22. The method of claim 9 further comprising displaying at least a portion of the subset of the catalog of functions on a display.

23. The method of claim 22 wherein the display is disposed on the selected device.

24. The method of claim 22 wherein the display is disposed on the HMI controller.

25. A hand-held device for managing devices, the hand-held device comprising:
a biometric input receiving biometric data;
a movable portion connected to an adjustable haptic feedback mechanism;
a location system, the location system generating a location data of the hand-held device;
a transmitter/receiver communicating with at least one of the devices;
a controller receiving the location data and the biometric data, the controller determining a standardized function catalog associated with a selected device based on the location data, allowing access via the movable portion to a subset of the standardized function catalog based on the biometric data received by the biometric input, and communicating user preferences based on the biometric data to the selected device.

26. The hand-held device of claim 25 wherein the adjustable haptic feedback mechanism adjusts a haptic feedback on the moveable portion by generating a detent in a rotational travel of the movable portion, and wherein the detent varies in quantity, size, and resistance in accordance with the subset of the standardized function catalog.

* * * * *